United States Patent [19]
Schmidt et al.

[11] Patent Number: 5,340,400
[45] Date of Patent: Aug. 23, 1994

[54] LINEAR MOTOR SURFACE COATING SYSTEM

[75] Inventors: Thomas D. Schmidt, Berwyn; Peter Smit, Newtown, both of Pa.

[73] Assignee: Megamation Incorporated, Lawrenceville, N.J.

[21] Appl. No.: 13,294

[22] Filed: Feb. 4, 1993

[51] Int. Cl.$^5$ ............................................. B05B 3/18
[52] U.S. Cl. ........................................ 118/313; 901/43; 901/22; 310/22; 310/17; 118/323; 118/321; 74/479 PF; 74/479 PP; 239/752
[58] Field of Search ............ 901/43, 22; 118/313, 118/323, 321; 74/479 BP, 479 PH, 479 PF, 479 PP; 310/12, 15, 17, 36, 39, 22, 37; 239/722, 752, 753

[56] References Cited

U.S. PATENT DOCUMENTS

| | | | |
|---|---|---|---|
| 3,633,651 | 1/1972 | Ruhlandt | 118/323 |
| 4,137,514 | 1/1979 | Wright | 74/479 PP |
| 4,342,535 | 8/1982 | Bartlett | 901/43 |
| 4,968,214 | 11/1990 | Shiotani | 74/479 PH |
| 5,158,614 | 10/1992 | Takeuchi | 118/323 |

FOREIGN PATENT DOCUMENTS

| | | | |
|---|---|---|---|
| 387549 | 9/1990 | European Pat. Off. | 239/752 |
| 1030036 | 7/1983 | U.S.S.R. | 118/323 |

*Primary Examiner*—W. Gary Jones
*Assistant Examiner*—John Hoffmann
*Attorney, Agent, or Firm*—Louis Weinstein

[57] ABSTRACT

Surface treating apparatus employing at least two linear motors driving a multiple linkage system for positioning the outlet of treatment apparatus such as a radiation head or a sprayer for coating objects and especially large objects. A combination of different motions such as linear, rotational and a combination thereof are achieved through varying relative speeds and/or selective movements of the linear motors used to drive the multiple linkage system. Treatment of the entire surface area of the item being treated is accomplished through with the number of reduced number of components of simplified design. One dimensional and two dimensional linear motors may be employed in the system. A second embodiment has a plurality of spray assemblies. Each assembly has a single arm and linear motor which moves along two perpendicular axes.

13 Claims, 4 Drawing Sheets

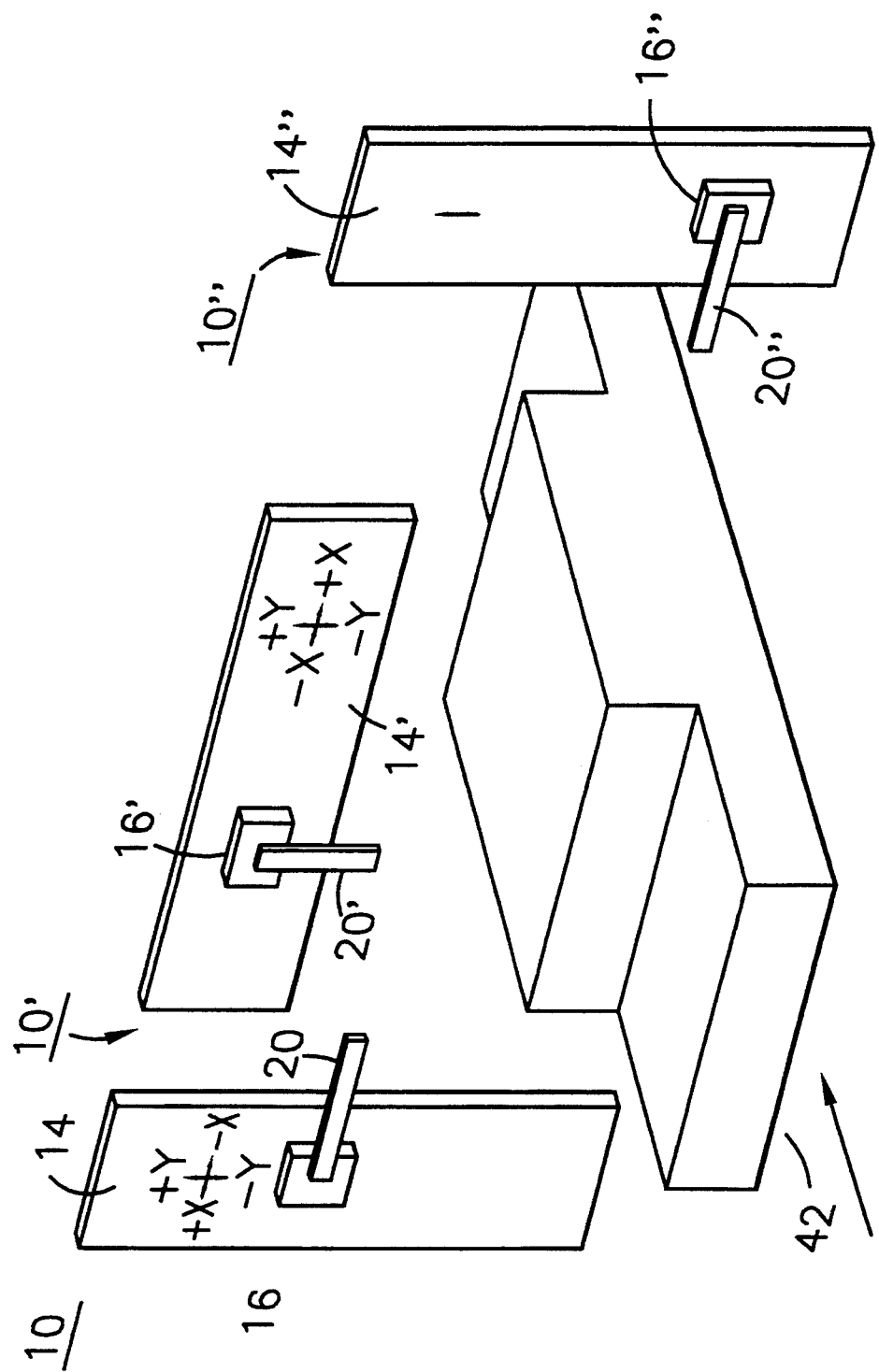

and assigned to the assignee of the present invention.
LINEAR MOTOR SURFACE COATING SYSTEM

FIELD OF THE INVENTION

The present invention relates to robotic systems for treating objects, and especially large objects, and more particularly to a novel treating system employing a multiple linkage system driven by linear motors capable of providing a plurality of different combinations of motion.

BACKGROUND OF THE INVENTION

There have been numerous efforts to automate coating systems such as for example, coating systems employed for painting automotive car bodies, components and the like. Some of these efforts have resulted in automated coating systems, which utilize articulated robots, and semi-programmable machines referred to as reciprocators. Basically, all of the machines developed to-date relied upon rotating electric motors utilizing ball screw systems, chain/sprocket arrangements, and gear/rack arrangements in order to obtain linear motion, which is required to move a spray gun over a work piece in a back and forth stroking motion, these approaches are expensive, complicated and inefficient.

BRIEF DESCRIPTION OF THE INVENTION

The present invention provides a coating system for automatic radiating, painting coating or the like, and which eliminates the conventional approaches toward automated coating systems to the employment of linear motors. The system may be used to great advantage for painting body parts of automobiles, trucks and the like.

The present invention is characterized by comprising a coating system, which utilizes linear motors in a unique manner for positioning and orienting outlet means such as spray heads coupled in one preferred embodiment, to a parallelogram-type linkage driven by said linear motors, the system being designed to provide a significantly reduced amount of moving parts resulting in increased efficiency and value to the user.

In one preferred embodiment, the invention comprises a mounting for a spray head, paint or coating gun or the like, pivotally connected to one end of each of a pair of linkage arms, said pivotal connections being a predetermined distance apart. The opposite ends of the linkage arms are pivotally connected to an associated linear motor. Each of the linear motors is movable independently of the other, and in various combinations, which collectively provide the ability to move the mounting member in mutually perpendicular directions, and to rotate the mounting member, which movements are, in turn, imparted to the spray head or other coating member.

OBJECTS OF THE INVENTION

It is therefore one object of the present invention to provide a novel automated system for radiating, coating and/or spraying parts, and especially large parts, in which the coating head or the like is driven by linear motors.

It is therefore one object of the present invention to provide a novel automated system for coating and/or spraying parts, and especially large parts, in which the coating head or the like is driven by linear motors coupled to a treating element mounting member by a simplified mechanical linkage system.

It is therefore one object of the present invention to provide a novel automated system for coating and/or spraying parts, and especially large parts, in which the treating or coating head or the like is driven by linear motors coupled to a mounting member by a simplified mechanical linkage system, wherein the linkage system is a parallelogram-type linkage system.

BRIEF DESCRIPTION OF THE FIGURES

The above as well as other objects of the present invention will become apparent from reading the accompanying description and drawings in which:

FIG. 3 is a perspective view showing still another preferred embodiment view of the present invention.

DETAILED DESCRIPTION OF THE INVENTION AND PREFERRED EMBODIMENTS THEREOF

Figures 1, 1A, 1B:
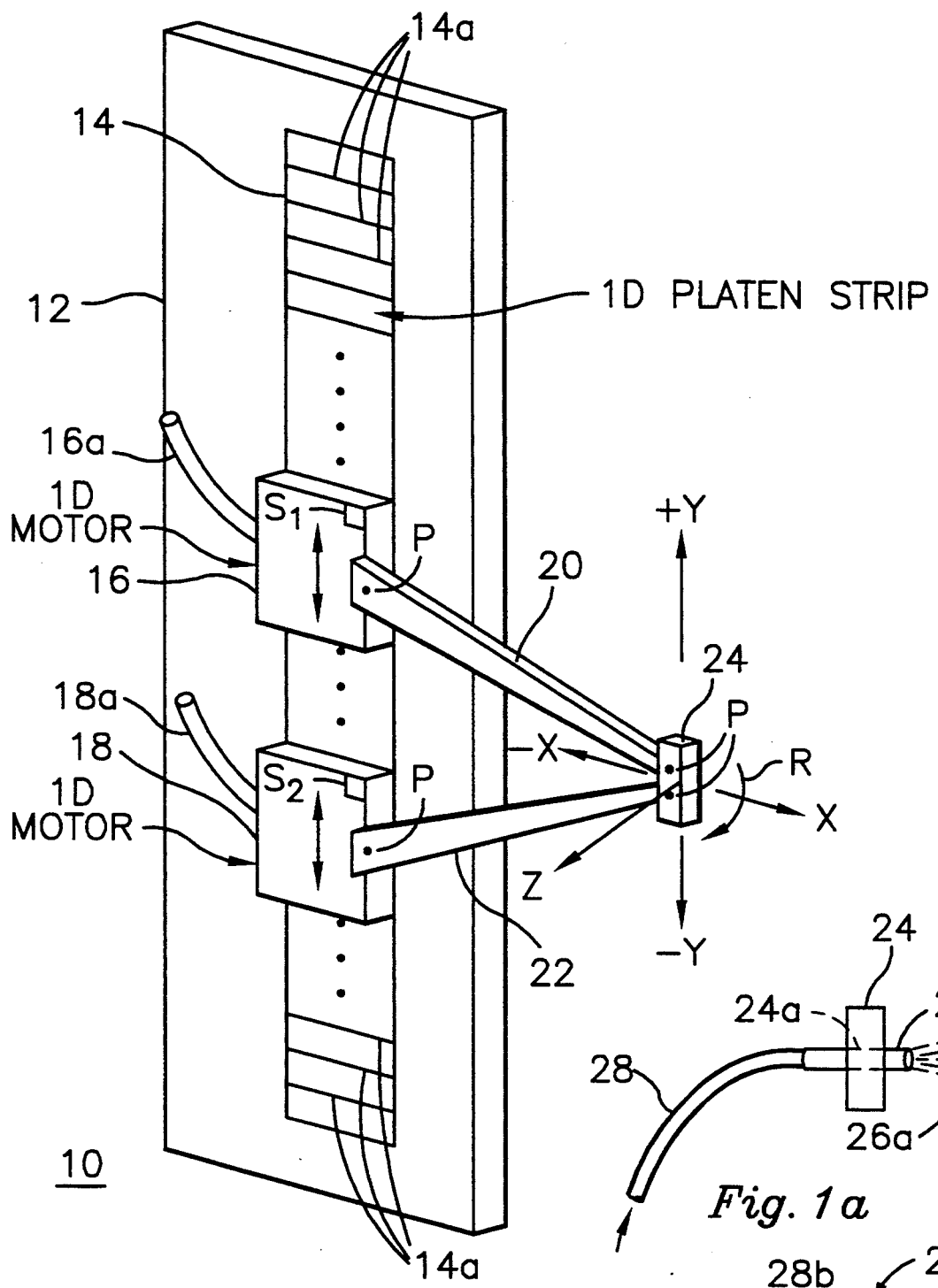
FIG. 1 shows a perspective view of an automated robotic-type coating system designed in accordance with the principles of the present invention, and utilizing linear motors as the driving means.
FIGS. 1a and 1b show detailed views of the mounting member of FIG. 1 and having spraying devices mounted thereon.

FIG. 1 shows one preferred embodiment 10 of the present invention, which is comprised of a support 12 provided with a platen 14 mounted thereon for use with linear motors 16 and 18 of the one dimensional-type, each linear motor being selectively independently movable in the plus (+) or minus (−) "Y" direction as shown by the arrows in FIG. 1. A pair of linkage arms 20 and 22 are pivotally coupled at their left-hand ends to suitable mounts (not shown) provided upon linear motors 16 and 18 by pivot pins P. The right-hand ends of linkage arms 20 and 22 are pivotally connected by pivot pins P to a mounting block 24, which may for example, be utilized for mounting a paint gun or the head of any suitable spray device. Each linear motor is coupled to a suitable source, and preferably a common source by umbilicals 16a, 18a, which couple suitable electrical power, air under pressure, and control signals to the linear motor.

The linear motors may be of the type described, for example, in U.S. Pat. No. 4,823,062, issued Apr. 18, 1989 and assigned to the assignee of the present invention.

For purposes of simplicity, and for purposes of the present invention it is sufficient to understand that the platen 14 is provided with equally spaced, linear, parallel grooves 14a forming elongated bars of a suitable ferromagnetic material. Grooves 14a are preferably filled with a suitable non-magnetic, and typically non-metallic, insulating material to provide a smooth, planar working surface along which the linear motors 16 and 18 move.

Umbilicals 16a and 18a, as mentioned above, further provide a source of air under pressure or alternatively provide electrical power for driving a motor or blower provided on each linear motor for forcing air under pressure into the region between the confronting surfaces of linear motors 16 and 18, and the working surface of platen 14, so that the linear motor rides on a "film" of air as it moves along platen 14. Each linear motor is provided with conventional forcers (not shown), which cooperate with the platen to selectively move each linear motor in the plus (+) or minus (−) "Y" direction. The linear motors may be accelerated, decelerated or moved at a constant velocity, which constant velocity may assume any value between the minimum and maximum limits of the linear motor.

Mounting member 24 may be provided with a suitable opening 24a (see FIG. 1a), which opening 24a receives the nozzle or spray head 26 of a paint gun or other spray device, which nozzle is coupled through a flexible conduit 28 to a suitable source (not shown) for delivering a coating under pressure to the spray head 26. The spray pattern 26a may take a variety of shapes, and have a variety of spray patterns according to the shape of the nozzle. Alternatively, the mounting head may be provided with a suitable mounting bracket for securing a spray head to the member 24.

In an alternative arrangement, an entire spray gun apparatus may be mounted upon member 24 as shown in FIG. 1b, in which a spray apparatus 28 including a self-contained paint or coating reservoir 28b, and a suitable pump 28c (not shown for purposes of simplicity) are mounted upon member 24, and emit a coating or spray from nozzle 28a.

The arrangement of FIG. 1a is preferred since this arrangement significantly reduces the amount of mass arranged on member 24, and further permits the use of a larger reservoir for storing the coating material than may be accommodated upon member 24.

A variety of linear and/or rotational movements are possible.

For example, linear motors 16 and 18 may be moved simultaneously in the plus (+) "Y" direction at the same speed thereby moving the mounting member 24 and hence the spray head 26 in the plus (+) "Y" direction at a constant rate. Alternatively, the linear motors may be moved at the same rate in the minus (−) "Y" direction to achieve substantially the same result.

As another alternative, linear motors 16 and 18 may be simultaneously moved in accordance with the same acceleration pattern, thereby moving member 24 and hence spray head 26 in the upward (or downward) Y direction at a predetermined acceleration. As another alternative, the linear motors may be operated to move at a first acceleration rate, and thereafter at a constant velocity for a predetermined interval, and thereafter at another acceleration (positive or negative) rate.

Depending upon the spacing desired between the outlet end of the spray head 26, and the surface of the member being coated, the linear motors 16 and 18 may be selectively operated so as to be moved closer to one another, or further apart from one another.

For example, by moving the linear motors closer together, this results in moving the spray head 26 in the plus (+) X direction enabling the distance between the spray head and the surface of the work piece being coated to be adjusted. In a similar fashion, by moving the linear motors further apart, the spray head 26 will be moved in the minus (−) X direction.

It is still further possible to cause head 26 to be rotated clockwise or counterclockwise about the Z axis, as shown by arrow R, by maintaining one of the linear motors stationary, and moving the other linear motor upwardly or downwardly, or vice versa, or by moving both linear motors at different velocities or at different accelerations.

The above motions may be utilized or combined in various combinations or sequences to handle a wide variety of different applications. As some examples, the linear motors may be maintained a predetermined distance apart and moved at a constant velocity when spraying a planar surface aligned parallel to the Y axis. Assuming that a curved convex surface is being sprayed, the linear motors may be moved to position the spray head at a point which may be at or near the center of the radius of curvature of the surface to be coated. The linear motors are then operated so as to cause the coating head to rotate about the aforementioned center of rotation. These techniques as well as others, which will be obvious to those having ordinary skill in the art, may be employed when it is desired to provide a coating of substantially constant thickness, for example. The linear motors may be moved at relatively different speeds to adjust the spacing of the spray head relative to the surface being sprayed, and the linear motors may be accelerated from a initial starting point to a point where the spray head is positioned adjacent one end of a work piece, the acceleration of both linear motors from the starting point to a point adjacent the workpiece increasing the operating efficiency of this system by reducing the amount of time required for a spray head to move from an initial reference point to a point where spraying or coating is to begin.

In applications where it is desired to apply two or more coatings, and wherein coating material is of a quick-dry type, the linear motors may be moved in a first direction to apply a first coating and then abruptly reversed and moved in the opposite direction (after a predetermined delay, if necessary to enable the first coating layer to dry) in order to apply a second or subsequent coatings.

Figure 1C:
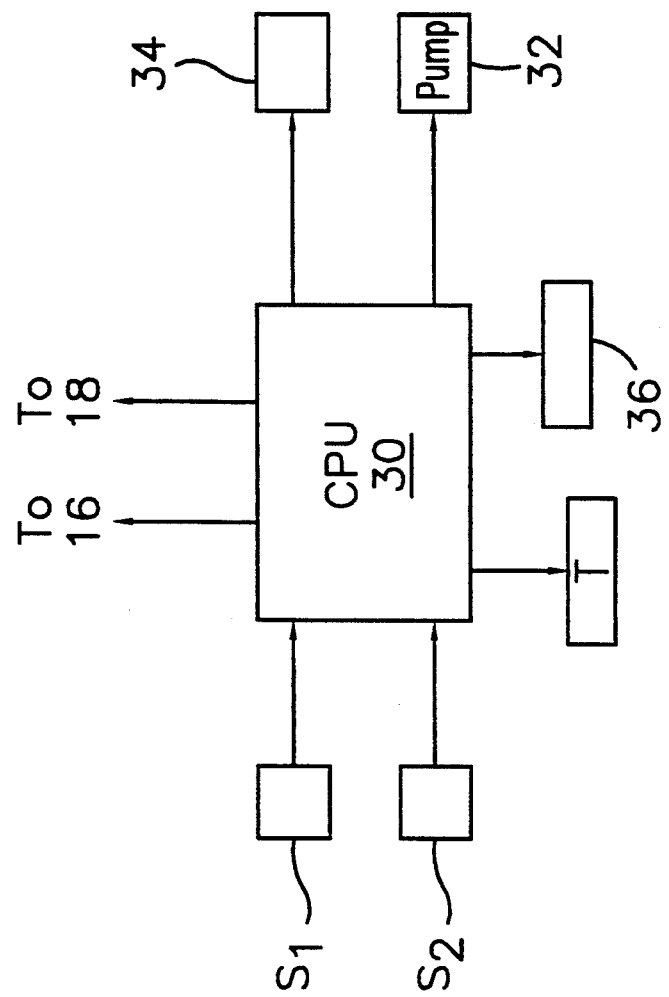
FIG. 1c is a block diagram of a controller for the system of FIGS. 1 and 2.

The overall system may be controlled by a CPU 30 shown in FIGS. 1c, which monitors sensors S1 and S2 respectively provided on linear motors 16 and 18, and stores a coating routine in memory, which may either be a RAM or EEPROM memory (or both) individually and/or collectively storing the operating steps for performing a particular coating operation.

With knowledge of the position of each linear motor, CPU 30 provides controls to the linear motors 16 and 18 operating the forcers (not shown for purposes of simplicity) to move the linear motors in accordance with a predetermined sequence to achieve selected ones of the linear and/or rotational movements described hereinabove to perform a coating operation. CPU 30 also operates a pump 32 for delivering coating material under pressure to head 26 through conduit 28 coupled to pump 32, and to further control a solenoid operating valve 34, which selectively opens or closes a nozzle provided within spray head 26, which may be of any conventional design to selectively emit coating material.

As another alternative, solenoid valve 34 may be an adjustable valve which, in addition to providing simple on/off operation may further provide an off position and a variety of on positions in applications where it is desired to alter the spray emitted from the spray head. CPU 30 may also control electrical control means 36, which serves to change the spray angle or pattern, for example, emitted by the spray head. For example, the spray head may be designed to emit a spray confined within a predetermined cone-shaped region where the apex angle of the cone may vary by controlling the electrical control circuit 36 to change the nature and/or spray area provided by the spray head.

Figure 2:
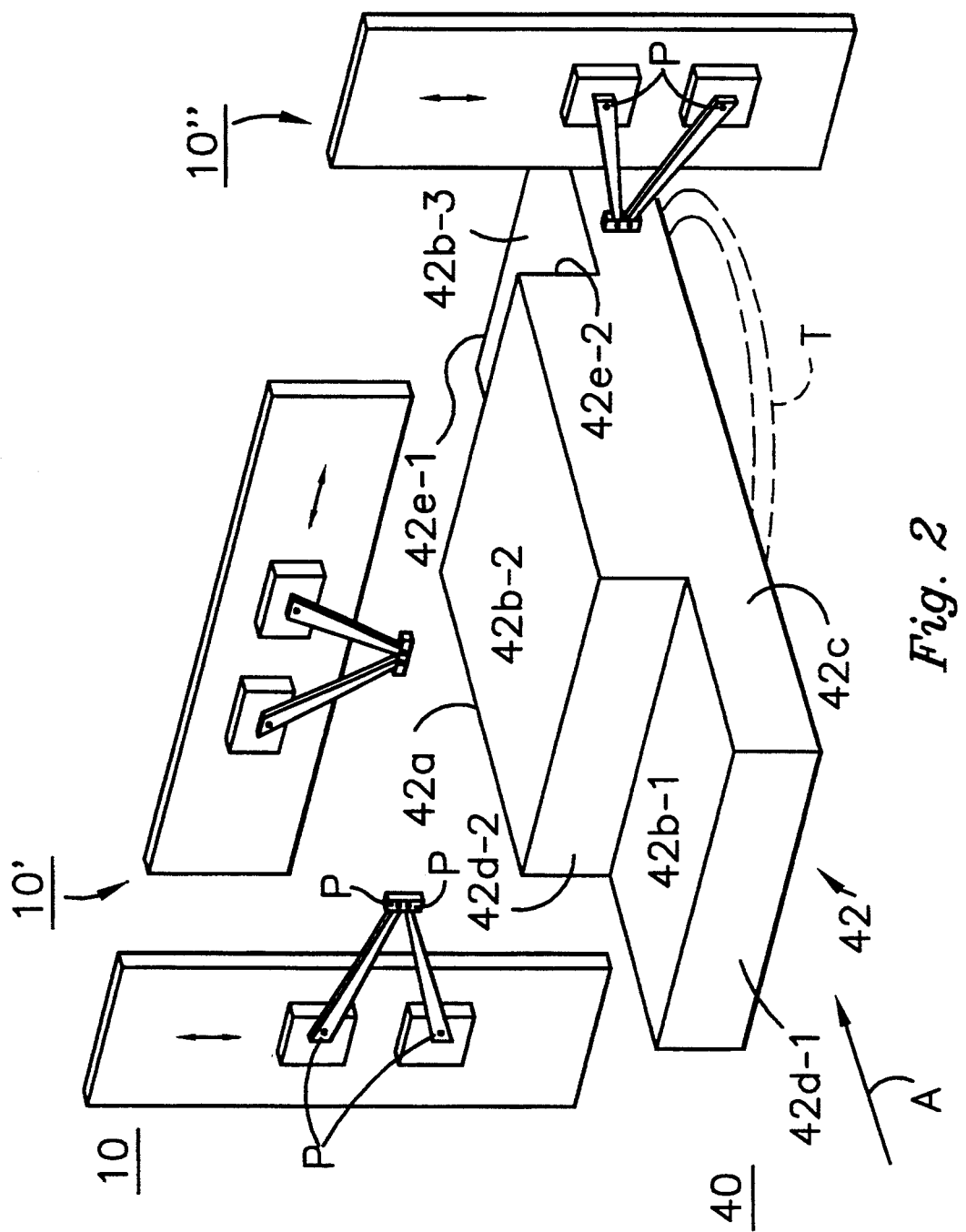
FIG. 2 is a perspective view of another embodiment of the present invention, in which a plurality of the assemblies of the type shown in FIG. 1 are employed to coat workpieces, and especially large workpieces.

FIG. 2 shows another alternative embodiment 40 of the present invention employing three spray assemblies 10, 10' and 10" each being similar in function and design to the assembly 10 shown in FIG. 1. Assembly 10 may be utilized to coat the left-hand vertical surface 42a of workpiece 42, assembly 10' is utilized to coat top surfaces 42b-1, 42b-2 and 42b-3 of work piece 42, while the assembly 10" is utilized to coat right-hand vertical surface 42c.

Workpiece 42 may be mounted upon a turntable T and, by rotating the workpiece 90° assemblies 10 and 10" may be utilized to coat vertical surfaces 42d-1, 42d-2 and 42e-1 and 42e-2, respectively. Assuming the workpiece to be mounted on a turntable, which is movable through an angle of 180° (or greater) the assembly 10' may be operated to coat a first half of the appropriate surface of the workpiece whereupon after rotation through an angle of 180°, assembly 10' is utilized to coat the remaining half of the surface to which it is assigned. CPU 30 shown in FIG. 1c may be provided with a means for controlling the turntable T to accomplish such results.

FIG. 3 shows still another alternative embodiment of the present invention in which the coating system is highly simplified by reducing the linkage assembly to a single linkage arm 20, 20', 20" fixedly mounted to a single linear motor 16, 16', 16", each of the linear motors in FIG. 3 being of the two-dimensional type and respectively cooperating with the platen 14, 14', 14", which has a grid-like pattern of equispaced parallel grooves forming a grid-work pattern of teeth, which cooperate with the forcers of each of the two-dimensional linear motors to provide two-dimensional movement of the linear motor in the plus (+) and minus (−) Y directions, and the plus (+) and minus (−) X direction. A nozzle or spray head is preferably mounted at the free end of each of the linkage arms 20, 20', 20". As a further alternative, each of the linkage arms 20, 20', 20" may be swingably mounted to its associated linear motor or have the spray head pivotally mounted to the linkage arm 20, 20', 20", and thereby be capable of providing the rotational movement accomplished in the embodiment of FIGS. 1 and 2 through the use of a pair of one-dimensional linear motors and the linkage assembly provided therein. The workpiece 42 may thus be coated or otherwise treated in a manner substantially similar that shown in the embodiment of FIG. 2. The workpieces 42 may be arranged in tandem on a conveyor (not shown for purposes of simplicity), which moves the pieces in the direction of arrow A shown in FIG. 3, the platens for each of the assemblies 10, 10', and 10" preferably being maintained stationary.

A latitude of modification, change and substitution is intended in the foregoing disclosure, and in some instances, some features of the invention will be employed without a corresponding use of other features. For example, surfaces may be treated by cleansing or rinsing solutions, may be ionized, treated with a radiation device to heat or radiate the workpiece. Accordingly, it is appropriate that the appended claims be construed broadly and in a manner consistent with the spirit and scope of the invention herein described.

What is claimed is:

1. A system for moving and orienting a treatment element for treating a workpiece, said system comprising:
   a treatment element;
   a mounting member for mounting said treatment element;
   a pair of linkage arms, each linkage arm having a first end and a second end, said first ends being pivotally coupled to said mounting member with pivotal couplings, said pivotal couplings being a spaced distance apart;
   a pair of linear motors;
   a common platen along which said linear motors are movable upon application of operating signals applied to said linear motors for activating a forcer of each linear motor, which forcers interact with said platen to selectively move said linear motors therealong;
   the second end of each of said linkage arms being pivotally coupled to one of said linear motors, whereby movement of said treatment element in first and second opposing directions along two mutually perpendicular axes, and rotation about a third axis mutually perpendicular with said first and second axis is obtained by selective movement of said linear motors.

2. The apparatus of claim 1 wherein said linear motors are linear motors having movement in only on dimension.

3. The apparatus of claim 1 wherein said treatment element is an element for coating a workpiece.

4. The apparatus of claim 1 wherein said treatment element is a spray element for spraying a liquid coating upon a work piece.

5. The apparatus of claim 4 wherein said liquid coating is delivered to said spray element by a suitable flexible conduit.

6. The apparatus of claim 4 wherein said spray element provides a given spray pattern.

7. The apparatus of claim 4 further comprising means for regulating the flow of a coating fluid delivered to said spray element.

8. The apparatus of claim 1 wherein said treatment element includes a spray head, a reservoir and pump means for delivering a coating material under pressure to said spray head.

9. A coating system for coating a workpiece comprising a plurality of spray assemblies for respectively coating selected surfaces of said workpiece, each of said spray assemblies being comprised of:
   a treatment element;
   a mounting member for mounting said treatment element;
   a pair of linkage arms, each linkage arm having a first end and a second end, said first ends being pivotally coupled to said mounting member with pivotal couplings, said pivotal couplings being a spaced distance apart;
   a pair of linear motors;
   a common platen along which said linear motors are movable upon application of operating signals applied to said linear motors for activating a forcer of each linear motor, which forcers interact with said platen to selectively move said linear motors therealong;
   the second end of each of said linkage arms being pivotally coupled to one of said linear motors, whereby movement of said treatment element in first and second opposing directions along two mutually perpendicular axes, and rotation about a third axis mutually perpendicular with said first and second axis is obtained by selective movement of said linear motors.

10. The apparatus of claim 9 further comprising a means for rotating a workpiece at a coating station where said treatment elements are positioned to facilitate a coating operation.

11. A coating system for coating a workpiece comprising a plurality of spray assemblies for respectively coating selected surfaces of said workpiece each of said assemblies being comprised of:
- a treatment element;
- a mounting member for mounting said treatment element;
- a linkage arm having first and second ends, said first end being coupled to said mounting member;
- a linear motor;
- a platen along which said linear motor is movable upon application of operating signals applied to said linear motor for activating a forcer of each linear motor, which forcer interacts with said platen to selectively move said linear motor therealong;
- the second end of the linkage arm being coupled to said linear motor, for moving said treatment element in first and second opposing directions along each of two mutually perpendicular axes, under control of said linear motor;
- said treatment element being a spray element for spraying a liquid coating upon a work piece.

12. The apparatus of claim 11 wherein spray material is delivered to said spray element by a suitable flexible conduit.

13. The apparatus of claim 11 further comprising means for regulating the flow of a coating fluid delivered to said spray element.

* * * * *